Nov. 2, 1971 F. G. ROUNDS Re. 27,211

FRICTION DRIVE FLUID

Original Filed July 25, 1966

INVENTOR.
Fred G. Rounds
BY
Peter P. Kozak
ATTORNEY

United States Patent Office

Re. 27,211
Reissued Nov. 2, 1971

27,211

FRICTION DRIVE FLUID

Fred G. Rounds, Troy, Mich., assignor to General Motors Corporation, Detroit, Mich.

Original No. 3,394,603, dated July 30, 1968, Ser. No. 567,494, July 25, 1966. Application for reissue Oct. 15, 1969, Ser. No. 871,490
Int. Cl. F16h *15/08*
U.S. Cl. 74—200 4 Claims

Matter enclosed in heavy brackets [ ] appears in the original patent but forms no part of this reissue specification; matter printed in italics indicates the additions made by reissue.

*ABSTRACT OF THE DISCLOSURE*

*A friction drive transmission such as a toric transmission having two axially aligned opposing power transmitting race members and at least one roller member disposed between the races in tractive rolling contact therewith, and a fluid film between the races and the roller at the points of contact, which fluid is the hydrogenated polymeric hydrocarbon reaction product of at least one of the olefinic hydrocarbon monomers taken from the group consisting of propene, butene and pentene, the polymer having a molecular weight of 300* to *500.*

This invention relates to friction drive machines having a rotatable power input member and a rotatable power output member in tractive rolling contact relationship. More specifically it relates to a new transmission fluid having particular utility in combination with such a friction drive device.

It is known that torque and power may be transmitted from a rotating driver member to a rotatable follower member by means of the friction or traction existing at the rolling contacts between them. A number of mechanisms have been proposed for transmitting torque and power in this way. One such mechanism is the well known toric-type transmission, an embodiment of which is described in U.S. Patent No. 2,076,057 issued to J. O. Almen. Such transmission devices offer certain potential advantages. One important advantage is the fact that the speed ratio between the power input and the power output can be varied without interrupting the transmission of power. However, high load friction drive devices have not achieved wide commercial acceptance because of their relatively short service life. The amount of torque that can be transmitted from one rolling member to another by traction at the rolling contact therebetween is a function of the load in the radial direction (normal load) and the coefficient of friction (or traction) at the point of contact. Thus, the normal load and/or the coefficient of traction must be increased to increase the transmitted torque. However, the maximum normal load that can be withstood at a contact surface is limited by the physical properties of the material of construction. The fatigue life (and service life) of the rolling contact surfaces is inversely proportional to the third or fourth power of the normal load. Therefore, any increase in the coefficient of friction at the rolling contact is desirable because the torque output could be increased without drastically reducing the service life of the contact surface, or alternatively the service life of the rolling contact could be increased without decreasing the torque output.

Of course, it is preferable to maintain a lubricating and cooling fluid between the rolling members in high load applications. Otherwise friction would cause the surfaces to overheat and fail. When toric transmissions were first considered for use in automobiles about thirty to forty years ago, the best known fluid for friction drives were the "as-distilled" naphthenic-based mineral oils. This petroleum fraction effected sufficient traction between the input member and the output member of the friction drive so that the required torque could be transmitted and a sufficient service life realized. However, frictional properties are not the only consideration in the selection of a transmission fluid. It was soon discovered that the naphthenic-based mineral oil had very low oxidation resistance and poor viscosity temperature properties over a range of temperatures from about −40° F. to 250° F. Other oils having greater stability and a higher viscosity index did not induce sufficient tractive capacity at the rolling contacts. Thus, in effect, no suitable transmission fluid has ever been discovered which would permit wide scale commercial application of high load friction drive transmission.

It is an object of this invention to provide a stable transmission fluid in a friction drive mechanism, which fluid has a suitable coefficient of kinetic traction and a viscosity index to increase the tractive efficiency and the fatigue life of the mechanism.

It is another object of this invention to provide a friction drive mechanism, such as a toric transmission, having a transmission fluid which is highly resistant to oxidation for long periods of time at temperatures between about −40° F. to 250° F., which has a coefficient of friction of kinetic traction equivalent to or superior to a naphthenic-based mineral oil, and which exhibits relatively constant viscosity over the above specified temperature range.

These and other objects are provided in accordance with my invention in a friction drive mechanism comprising a rotatable power input member and a rotatable power output member which are in tractive rolling contact with each other. Between and, when suitable, around these members, is provided a polymeric hydrocarbon transmission oil. These hydrocarbon polymers are the reaction product or products of certain specific olefinic hydrocarbon monomers. The monomeric starting materials may consist of propene and butene, and/or pentene. As used herein, butene refers collectively to all of the four carbon hydrocarbon olefins such as butene-1, cis and trans butene-2 and isobutylene. Similarly, as used herein, pentene refers collectively to all of the five carbon hydrocarbon olefins. These olefins and others are commonly prepared as a mixture by cracking a suitable petroleum fraction. Commercial separation techniques yield relatively pure fractions of the respective olefins which may be polymerized to a suitable molecular weight. In accordance with my invention the average molecular weight of the polymeric fluid lies in the range of about 300 to 500. The preferred composition is a polybutene having a molecular weight of about 400.

Other objects of my invention will become apparent in view of the detailed description thereof which follows, reference being made to the attached drawings in which.

As mentioned above, a large number of mechanical arrangements have been conceived whereby torque and power can be transmitted from a drive member to a follower member by means of traction between the respective parts in rolling contact. In some of the more omplex of these arrangements, such as the toric transmission, means may be provided for an infinitely variable peed ratio between the driving and following members vithin the limits of the design. However, as is frequently he case, the state of the design of these various mechaisms has exceeded the properties of available materials f construction and lubrication. My invention provides neans whereby these prior art designs may be brought o practical fruition.

Figure 1:
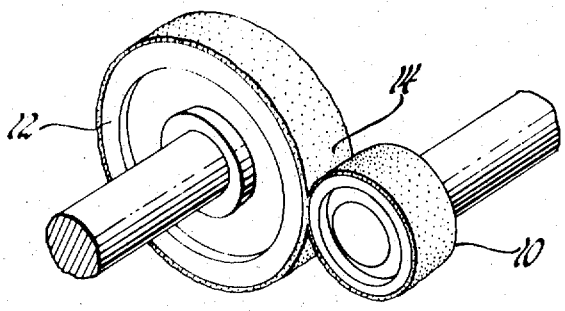
FIGURE 1 is a perspective view of two roller members in tractive rolling contact adapted such that their respective axes of rotation are parallel.
Figure 2:
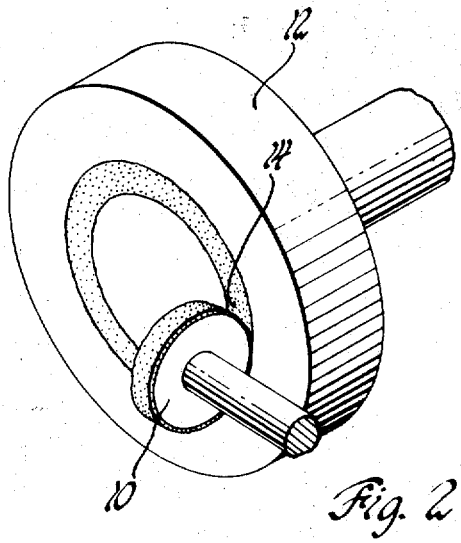
FIGURE 2 is a perspective view of two roller members in tractive rolling contact adapted such that their respective axes of rotation are mutually perpendicular.
Figure 3:
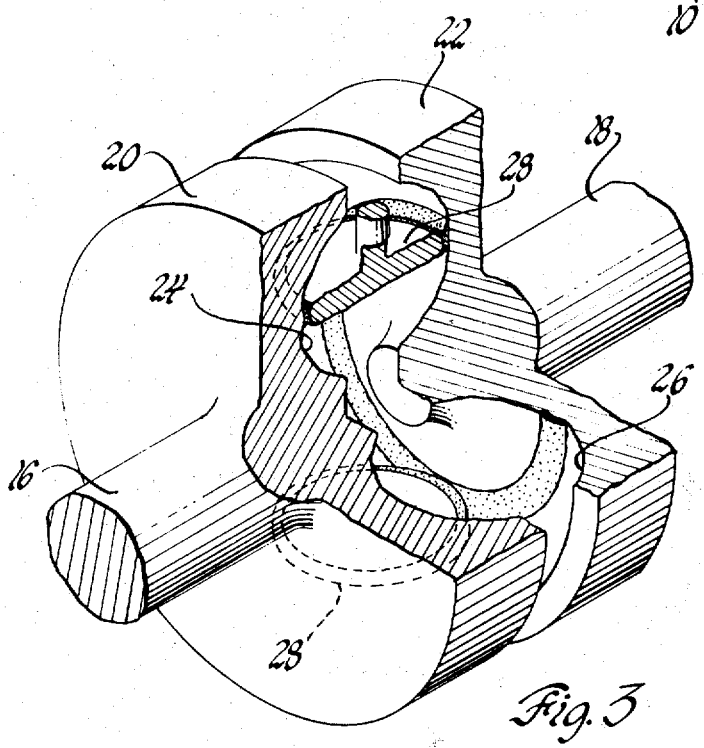
FIGURE 3 is a perspective view of the basic elements of the toric-type transmission to which my invention may be applied.

FIGS. 1–3 illustrate a few of the basic arrangements n which my invention may be used. Of course, it is to e understood that many other embodiments could and ave been conceived which are combinations of these nore simple elements and one skilled in the art could eadily apply my invention thereto. FIG. 1 shows two ollers in tracting rolling contact relationship abutting at heir respective outer cylindrical surfaces. Roller 10 is he driving member and roller 12 is the following or riven member. Between these two members is provided film of a suitable lubricant 14. The thickness of the ubricating and cooling film is typically about ten to orty microinches. In the three figures of my drawing, his thickness relative to the size of the rolling members as been exaggerated somewhat for purposes of illustraion. To transmit torque from rotating power input memer 10 to rotatable power output member 12, means (not hown here) must be provided to apply a load normal o the contact surfaces. In FIG. 2 is shown a slightly lifferent relationship. Again a torque is transmitted from he power input member 10 to the power output member r driven member 12 by means of traction. However, in his case the plane of the roller 10 is perpendicular to the lane of roller 12 and a different change in the direction f the torque vector is obtained. A film 14 of suitable transission lubricating oil is provided between the members.

FIG. 3 is a simplified perspective representation of a oric-type transmission. As shown, this mechanism is omprised of two drive shafts, 16 and 18, coaxially aligned, wo opposing power transmitting races, 20 and 22, atached to the drive shafts, and a plurality of rollers 28 nounted between the races by means not shown. Each rive shaft 16, 18 is rigidly attached to the back side of power transmitting race 20, 22. The face of each race 0, 22 is formed with a toroidal raceway. Raceway 24 of ace 20 corresponds to and faces raceway 26 of race 22. One or more rollers 28 mounted between the races 20, 22 oll in each of the raceways 24, 26 to convert the rotation f one race into rotation of the other, but in the opposite ense.

In operation of the toric drive a torque is applied y external means (not shown) to one of the drive shafts s for example 16. Shaft 16 and the attached race 20 roate in the direction of the impressed torque. At the same ime a force is applied to the respective races 20, 22 ending to force them together against rollers 28. Roating race 20 causes rollers 28 to rotate because of tracion at the rolling contact surfaces between raceway 24 nd rollers 28. The rotating rollers 28 in turn act upon he opposing race 22 by traction between the contact surfaces of the rollers 28 and raceway 26 to transmit torque hereto. In this arrangement a fluid is applied, at least to he respective contact surfaces, to supply lubrication and ooling while maintaining the traction at a suitable level.

I have found an oil composition that may be used in ombination with the above-described types of friction rive transmissions whereby the tractive efficiency of he transmission is maintained and the service life of the nechanism is greatly extended. This transmission oil comrises polymeric hydrocarbons having a molecular weight n the range of about 300 to 500.

Suitable polymers may be formed by polymerizing olefin nonomers having three to five carbon atoms. I have found hat polymers formed from propene and/or the various somers of butene and pentene in the above-specified nolecular weight range have the requisite properties of lubricity, relatively high kinetic coefficient of friction, suitable viscosity index and good chemical stability. I have also found that of the suitable polymers, polybutenes having a molecular weight of about 400 are preferred because they have excellent friction properties coupled with the other required properties.

These polymeric products of the $C_3$–$C_5$ olefin hydrocarbon monomers are commercially available by polymerizing techniques well known to petroleum chemists. In some cases, however, as a result of the polymerization process the polymers may have residual unsaturation. While such unsaturated polymers are operable in accordance with my invention I have found that the chemical stability of the transmission oil is advantageously increased if the polymer is hydrogenated to remove this unsaturation.

In many applications well known transmission fluid additives such as viscosity index improvers and oxidation inhibitors may beneficially be added to the polymeric hydrocarbon fluid. The viscosity indices of my fluids are inherently superior to those of the naphthenic-based mineral oils. However, still further improvement in the viscosity-temperature properties of a friction drive fluid may be obtained by the addition of known additives to my polymeric hydrocarbons. An example of a viscosity index improver is Acryloid 710, a polymethacrylate. An example of a commerically used oxidation inhibitor is 2,6-ditertiarybutyl-paracresol. These materials are added in small but effective amounts, usually up to about 3% by weight.

A major requirement of a transmission fluid in a friction drive transmission is that it give the highest possible kinetic friction without a drastic concommitant increase in viscosity. In automotive applications of my invention, for example, the preferred viscosity range of the fluid is that of the known automatic transmission fluids. The fluids have a viscosity of about 7–8.2 centistokes at 210° F. and about 36–48 centistokes at 100° F. However, the conventional automatic transmission fluids display a much lower kinetic coefficient of friction than is required in accordance with my invention.

The coefficient of friction or traction, which is one measure of the tractive capacity of a rolling contact, can be defined as the ratio of the tangential force to the normal load. The limiting value of the coefficient of traction is the coefficient of traction at slip, which is observed when the rolling contact is on the verge of gross slip. In a given friction drive, coefficient of traction can be computed by knowing the normal load on the contact and by simultaneously measuring the input and output torques. The absolute value of the coefficient of traction between the contact surfaces of two rolling members in tractive relationship and having a lubricating film therebetween is a function of a number of variables in addition to that of the lubricant composition. Among these variables are included the value of the normal load at the contact surfaces, the rolling contact velocity, the temperature of the fluid, the speed ratio between the members, the composition of the rolling components, the surface finish of the rolling components, and the surface topography. Because of the large number of variables involved, the traction characteristics of a given lubricant under a specific set of conditions does not necessarily indicate that it is superior to other fluids under different operating conditions. However, I have found that the above-specified polymeric hydrocarbon oils gave consistently superior performance over other known fluids in friction drive mechanisms. For example, I have found that hydrogenated polybutene containing 3% by weight Acryloid 710 and 1% by weight 2,6-ditertiarybutyl-paracresol gave up to 37% higher friction than a naphthenic-based oil containing 3% by weight Acryloid 710 and 1% by weight of the paracresol. This test was run on a 100 H.P. straight roller, fixed ratio friction drive unit. In addition to the higher coefficient of traction the hydrogenated polybutene has substantially superior oxidation resistance and viscosity temperature properties to the naphthenic based mineral oils.

Because of the desirability of substituting friction drives for nonfriction-type transmissions in many applications, it is required that the viscosity-temperature properties and oxidation stability of a friction drive fluid be comparable to those of currently used automatic transmission fluids. The viscosity-index of polymeric hydrocarbons used in accordance with my invention may readily be increased to this specified level by the use of well known automatic transmission fluid viscosity index improvers. With respect to oxidation stability the hydrogenated polymers of my invention clearly pass the Automatic Transmission Fluid Type A Qualification Powerglide Oxidation Test which is a standard oxidation stability test used in the automotive industry.

In nearly 2,000 tests run with various mineral oil frictions, synthetic fluids and various additive treated lubricants the $C_3$–$C_5$ polymeric hydrocarbons specifically have given outstanding frictional, chemical stability and acceptable viscosity-temperature properties. Thus, I have described my invention in terms of a few basic friction drive mechanisms wherein $C_3$–$C_5$ polymeric hydrocarbon fluids were used at the rolling contact surfaces. However, other friction drive devices incorporating such a fluid can be adapted by those skilled in the art and thus the scope of my invention should be considered limited only by the following claims.

I claim:

1. In a friction drive [machine] *transmission* comprising a power input member and a power output member in tractive rolling contact relationship, an oxidation-resistant fluid film between said members, said fluid [comprised] *consisting essentially* of the *hydrogenated* polymeric reaction product of at least one of the olefinic hydrocarbon monomers taken from the group consisting of propene, butene, and pentene, said polymer having a molecular weight of 300 to 500.

2. The friction drive of claim 1 wherein said fluid [is comprised] *consists essentially* of *hydrogenated* polybutene having a molecular weight of about 400.

[3. The friction drive of claim 2 wherein said polybutene is a hydrogenated polybutene.]

4. In a toric transmission mechanism comprised of at least two axially aligned opposing power transmitting race members each having a toric raceway in its opposing face and at least one roller member disposed between said race members in tractive rolling contact relationship with each of said raceways, a fluid film between said races and roller at the points of contact, said fluid [comprised] *consisting essentially* of *the hydrogenated* polymeric hydrocarbon reaction product of at least one of the olefinic hydrocarbon monomers taken from the group consisting of propene, butene, and pentene, said polymer having a molecular weight of about 300 to 500.

5. The toric transmission mechanism of claim 4 wherein said fluid [is comprised] *consists essentially* of *hydrogenated* polybutene having a molecular weight of about 400.

[6. The toric transmission mechanism of claim 5 wherein said polybutene is a hydrogenated polybutene.]

References Cited

The following references, cited by the Examiner, are of record in the patented file of this patent or the original patent.

UNITED STATES PATENTS

| | | | |
|---|---|---|---|
| 2,159,220 | 5/1939 | McNulty | 74—200 UX |
| 2,701,970 | 2/1955 | Kraus | 74—200 |
| 3,048,047 | 8/1962 | Richardson | 74—200 |

OTHER REFERENCES

Rouverol et al.: ". . . Factors Affecting Tractive . . . Coefficients . . ."; ASLE Transactions, vol. 1(3); April 1960; pp. 11–17.

Rounds: "Effect of Lubricant . . . on Friction . . ."; Journal of Chemical & Engineering Data; vol. 5, No. 4, October 1960.

Bidwell: "Rolling Contact Phenomena"; Proceedings of Symposium, General Motors Research Laboratories, Warren, Mich.; October 1940.

MILTON KAUFMAN, Primary Examiner